United States Patent
Chung et al.

(10) Patent No.: US 12,481,398 B2
(45) Date of Patent: Nov. 25, 2025

(54) DISPLAY DEVICE, TOUCH DEVICE AND TOUCH CALIBRATION METHOD

(71) Applicant: NOVATEK Microelectronics Corp., Hsinchu (TW)

(72) Inventors: Yu-Chen Chung, Tainan (TW); Cheng-Feng Hsieh, Tainan (TW); Chin-Lin Lee, Hsinchu (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 18/798,791

(22) Filed: Aug. 8, 2024

(65) Prior Publication Data
US 2025/0278152 A1    Sep. 4, 2025

(30) Foreign Application Priority Data
Mar. 1, 2024 (TW) ................. 113107609

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC ................................ G06F 3/041; G06F 3/044
USPC ................................................. 345/173–174
See application file for complete search history.

(56) References Cited

U.S. PATENT DOCUMENTS

| | | | | |
|---|---|---|---|---|
| 2009/0189867 A1* | 7/2009 | Krah | ...................... | G06F 3/0446 345/173 |
| 2009/0256817 A1* | 10/2009 | Perlin | ................... | G06F 3/0233 178/18.05 |
| 2014/0176495 A1* | 6/2014 | Vlasov | ................. | G06F 3/0441 345/174 |
| 2014/0267132 A1* | 9/2014 | Rabii | .................. | G06F 3/04182 345/173 |
| 2016/0283023 A1 | 9/2016 | Shin et al. | | |
| 2017/0024078 A1 | 1/2017 | Bokma et al. | | |
| 2018/0217710 A1* | 8/2018 | Cholasta | ............... | G06F 1/3262 |

(Continued)

FOREIGN PATENT DOCUMENTS

| CN | 103488360 A | 1/2014 |
|---|---|---|
| CN | 115298644 A | 11/2022 |

(Continued)

*Primary Examiner* — Kwin Xie
(74) *Attorney, Agent, or Firm* — CKC & Partners Co., LLC

(57) ABSTRACT

A touch device, comprising a touch circuit and a processor. The processor comprises a first sensing circuit and a second sensing circuit. The first sensing circuit is coupled to a detection capacitor of the touch circuit, and is configured to detect a capacitance change of the detection capacitor according to a first reference value. The second sensing circuit is coupled to the detection capacitor of the touch circuit, and determines an equivalent capacitance value of the detection capacitor to generate a second reference value. The second sensing circuit detects the capacitance change of the detection capacitor according to the second reference value. The first sensing circuit detects the capacitance change of the detection capacitor in multiple detection periods, the second sensing circuit determines the equivalent capacitance value of the detection capacitor in multiple calibration periods, and the calibration periods and the detection periods are staggered.

17 Claims, 5 Drawing Sheets

(56) References Cited

U.S. PATENT DOCUMENTS

| | | | |
|---|---|---|---|
| 2019/0181860 A1* | 6/2019 | Cholasta | G06F 3/04166 |
| 2019/0227669 A1* | 7/2019 | Maharyta | G06F 3/0448 |
| 2019/0272056 A1 | 9/2019 | Wang et al. | |
| 2020/0033979 A1* | 1/2020 | Sauer | G06F 3/044 |
| 2020/0272301 A1* | 8/2020 | Duewer | G06F 3/045 |

FOREIGN PATENT DOCUMENTS

| | | |
|---|---|---|
| TW | 201136180 A1 | 10/2011 |
| TW | 201211977 A1 | 3/2012 |
| TW | 201640291 A | 11/2016 |

* cited by examiner

DISPLAY DEVICE, TOUCH DEVICE AND TOUCH CALIBRATION METHOD

CROSS-REFERENCE TO RELATED APPLICATION

This application claims priority to Taiwan Application Serial Number 113107609, filed Mar. 1, 2024, which is herein incorporated by reference in its entirety.

BACKGROUND

Technical Field

The present disclosure relates to a touch control technology, especially a display device, a touch device and a touch calibration method.

Description of Related Art

With the rapid development of electronic technology, display device is widely used in daily life, and there functions are becoming more and more diverse. The touch function is a common basic function on display devices, it can be used to detect the user's touch operation on the display device, such as the position of the finger on the display circuit and the pressure of the touch. The response speed and accuracy of the display device when performing touch functions will become one of the important factors affecting the user experience.

SUMMARY

One aspect of the present disclosure is a touch device, comprising a touch circuit and a processor. The processor is coupled to the touch circuit, comprises a first sensing circuit and a second sensing circuit. The first sensing circuit is coupled to a detection capacitor of the touch circuit, and is configured to detect a capacitance change of the detection capacitor according to a first reference value. The second sensing circuit is coupled to the detection capacitor of the touch circuit, and is configured to determines an equivalent capacitance value of the detection capacitor to generate a second reference value. The second sensing circuit is configured to detect the capacitance change of the detection capacitor according to the second reference value. The first sensing circuit detects the capacitance change of the detection capacitor in a plurality of detection periods, the second sensing circuit determines the equivalent capacitance value of the detection capacitor in a plurality of calibration periods, and the plurality of calibration periods and the plurality of detection periods are staggered.

Another aspect of the present disclosure is a touch calibration method, comprising: providing a first sensing circuit and a second sensing circuit, wherein the first sensing circuit and the second sensing circuit are coupled to a detection capacitor of a touch circuit; establishing, by the first sensing circuit, a first reference value; and detecting, by the first sensing circuit, a capacitance change of the detection capacitor in a plurality of detection periods, and determining, by the second sensing circuit, an equivalent capacitance value of the detection capacitor in a plurality of calibration periods to generate a second reference value, wherein the plurality of calibration periods and the plurality of detection periods are staggered.

Another aspect of the present disclosure is a display device, comprising a display circuit, a touch circuit and a processor. The processor is coupled to the display circuit and the touch circuit, comprises a first sensing circuit and a second sensing circuit. The first sensing circuit and the second sensing circuit are respectively configured to detect a capacitance change of a detection capacitor. When the processor activates the display circuit according to a wake-up signal, the first sensing circuit is configured to establish a first reference value in an initial period to detect the capacitance change of the detection capacitor. After establishing the first reference value, the processor is configured to alternately drive the first sensing circuit and the second sensing circuit until the second sensing circuit generates a second reference value according to an equivalent capacitance value of the detection capacitor.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
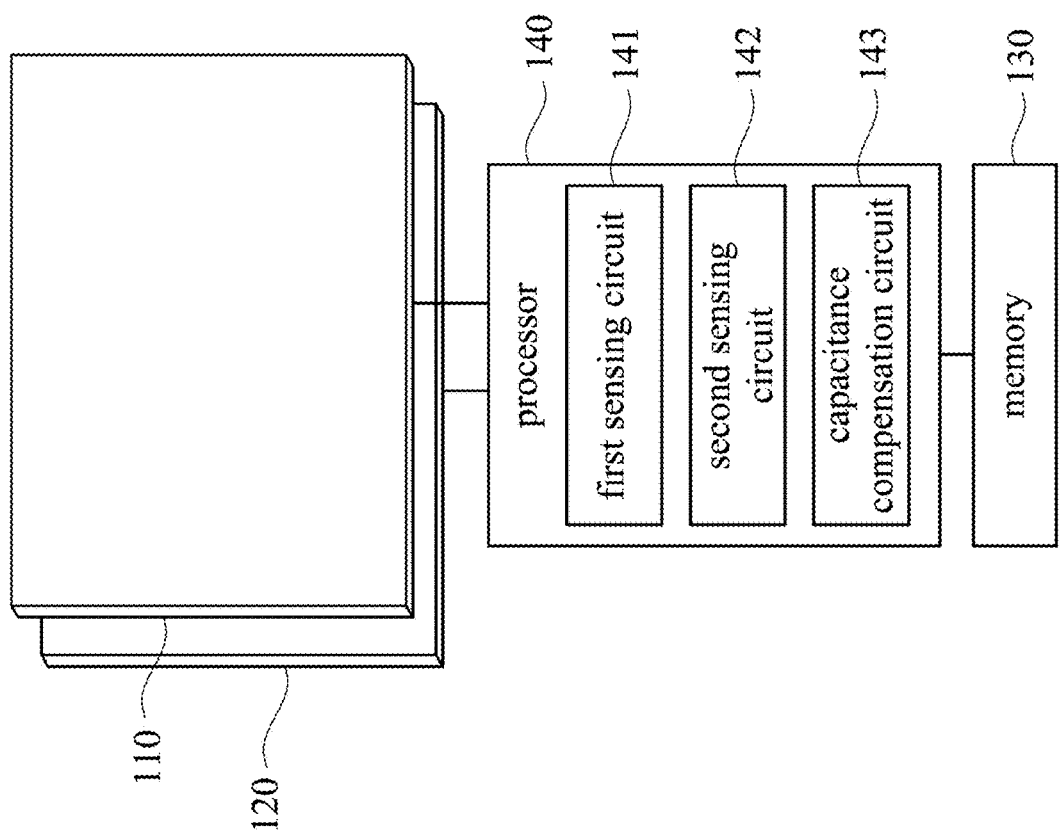
FIG. 1 is a schematic diagram of a display device in some embodiments of the present disclosure.

The present disclosure relates to a display device and a touch device. FIG. 1 is a schematic diagram of a display device in some embodiments of the present disclosure. The display device 100 includes a display circuit 110, a touch circuit 120 and a processor 140.

In one embodiment, the display circuit 110 can be a display panel, and is configured to generate a driving voltage according to an image signal, so as to control internal multiple pixel circuits (not shown in figure) and display a corresponding screen.

In one embodiment, the touch circuit 120 can be a touch panel, and arranged on one side of the display panel, or can be integrated with a display circuit. The touch circuit 120 has multiple scan lines and multiple capacitors. When an object contacts the display device 100, the equivalent capacitance value of the touch circuit 120 will change, so that the processor 140 can calculate a contact position of the object. In one embodiment, the touch circuit 120 may be a projected capacitive touch panel, but the present disclosure is not limited thereto. Since those skilled in the art can understand the operating principle of the touch circuit, it will not repeat it here.

The processor 140 is coupled to the display circuit 110 and the touch circuit 120, and includes a first sensing circuit 141 and a second sensing circuit 142. The first sensing circuit 141 and the second sensing circuit 142 are respectively configured to detect a capacitance change of a detection capacitor in the touch circuit 120 (e.g., detects the corresponding capacitance value of the contact position, or the overall capacitance value in the detection area), to determine whether there is a touch event or the touch signal input.

In one embodiment, the first sensing circuit 141 and the second sensing circuit 142 may be sub-circuits or sub-chips inside the processor 140. In other embodiments, the first sensing circuit 141 and the second sensing circuit 142 can be operating modules within the processor 140. The first sensing circuit 141 and the second sensing circuit 142 are coupled to the touch circuit 120 respectively, so as to obtain the capacitance change of the detection capacitor and determine the contact information by calculation (e.g., contact coordinates, contact force, contact area, etc.).

Figure 2:
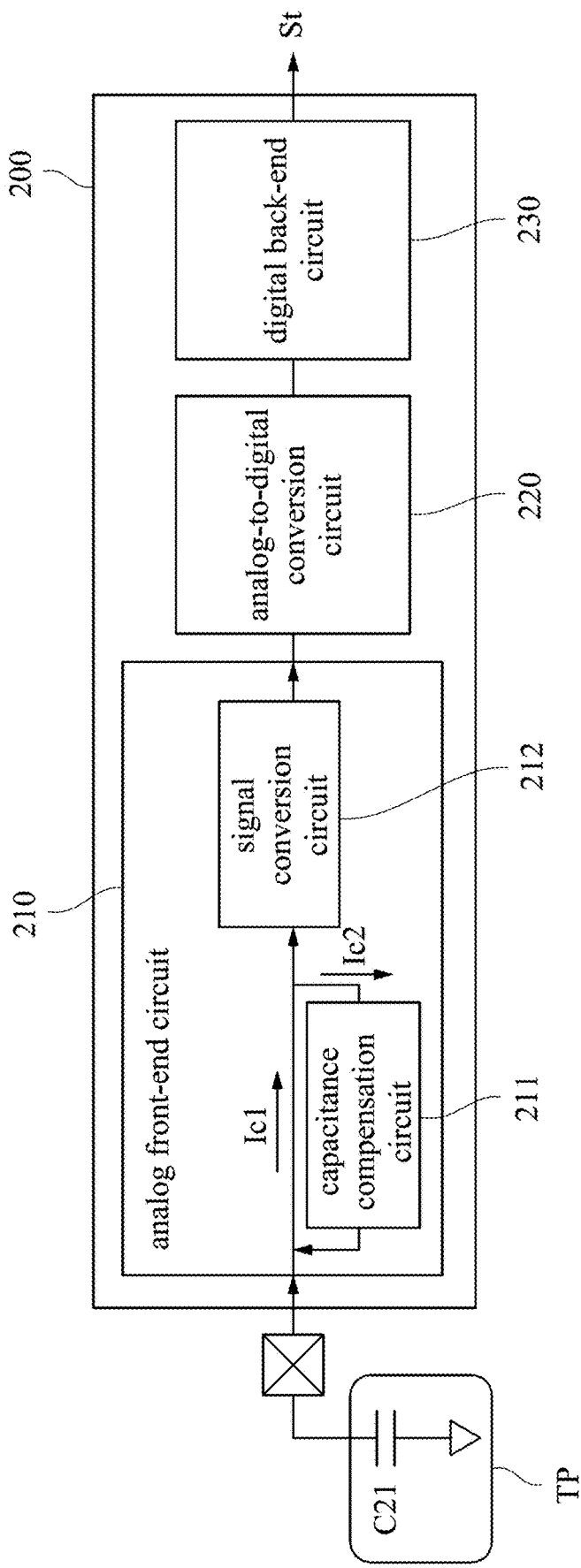
FIG. 2 is a schematic diagram of a processor in some embodiments of the present disclosure.

FIG. 2 is a schematic diagram of a processor in some embodiments of the present disclosure. The processor 200 in FIG. 2 can be applied to implement the processor 140 in FIG. 1. The processor 200 includes an analog front-end circuit 210, an analog-to-digital conversion circuit 220 and a digital back-end circuit 230. Referring to FIG. 1 and FIG. 2, the analog front-end circuit 210 is coupled to a sensor pad of the touch circuit 120 to detect the capacitance change of the detection capacitor C21. In one embodiment, the first sensing circuit 141 and the second sensing circuit 142 are integrated in the analog front-end circuit 210.

As mentioned above, the analog-to-digital conversion circuit 220 is configured to convert an analog signal detected by the analog front-end circuit 210 into a digital signal, and output a touch signal St through the digital back-end circuit 230. Specifically, in one embodiment, the analog front-end circuit 210 (i.e., the first sensing circuit 141 and/or the second sensing circuit 142) detects a current change of the detection capacitor C21, so as to calculate the capacitance value or the capacitance change of the detection capacitor C21. The digital back-end circuit 230 converts the detected current signal or capacitance signal into a count value to determine whether a touch event occurs.

In one embodiment, before the sensing circuits 141/142 detect the current change of the detection capacitor C21 to determine whether a touch event occurs, the sensing circuits 141/142 can establish a reference value as a reference parameter for subsequent determination. Specifically, the sensing circuits 141/142 is configured to determine/detect the equivalent capacitance value of the detection capacitor C21 without an object contacting the display device 100. This equivalent capacitance value is called an environmental capacitance value (Environment Capacitor). The sensing circuits 141/142 generate the reference value according to this equivalent capacitance value (environmental capacitance value). Since the environmental capacitance value will be affected by environmental factors (e.g., temperature), it must be detected for confirmation over a period of time.

For example, in the process of establishing the reference value for calibration, the processor 140/200 compensates the received original detection data (raw data, such as the detected capacitance value) by the sensing circuits 141/142, and continuously changes the amount of the compensation signal until the received original detection data meets expectations. Then, the processor 140/200 establishes a reference value according to the original detection data as a reference for subsequent touch determination.

Figure 3:
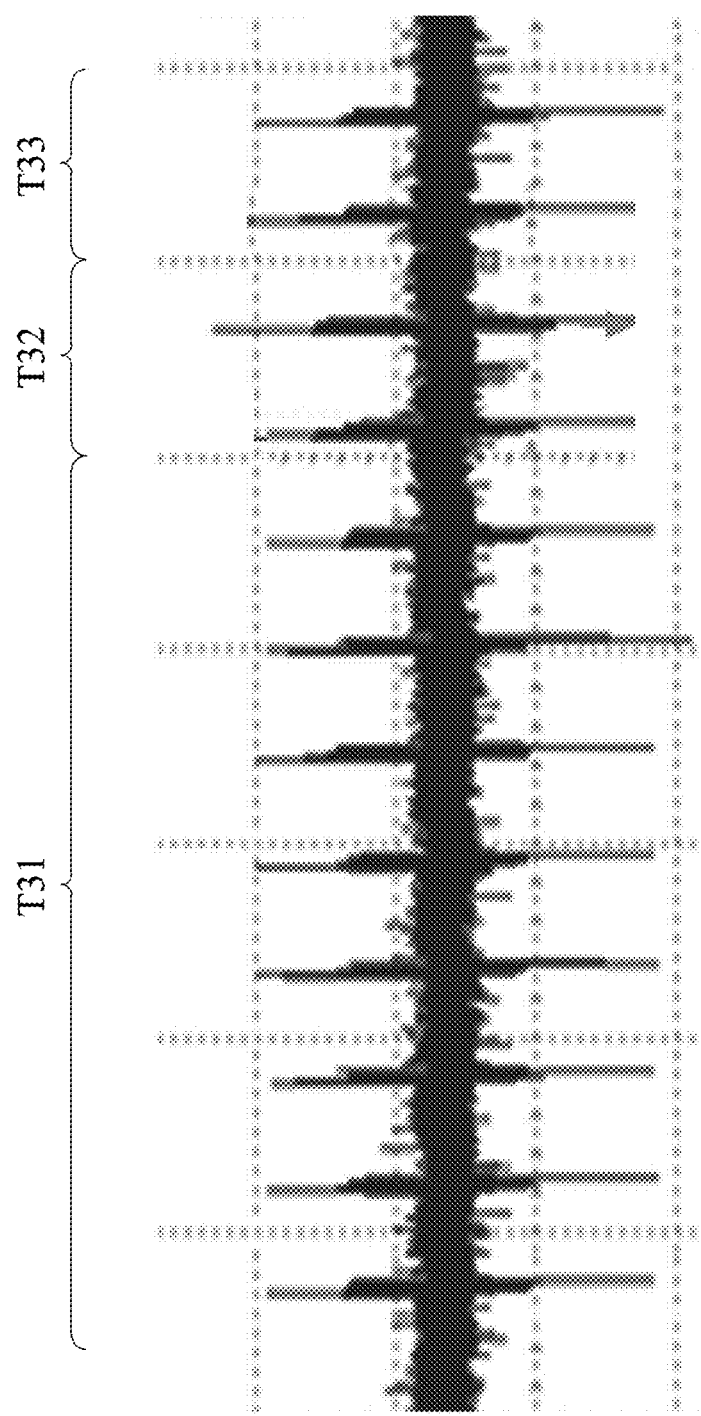
FIG. 3 is a schematic waveform diagram of the sensing circuit in some embodiments of the present disclosure.

FIG. 3 is a schematic waveform diagram of the sensing circuits 141/142 during establishing the reference value in some embodiments of the present disclosure, wherein the horizontal axis represents time, and the vertical axis represents current value. Here, the second sensing circuit 142 is used as an example. As shown in FIG. 3, in one embodiment, the second sensing circuit 142 continuously detects the current change of the detection capacitor C21 to determine the equivalent capacitance value (the environmental capacitance value) of the detection capacitor C21. After multiple frame periods, the second sensing circuit 142 establishes a reference value according to the current change detected during this period. The period during which "the equivalent capacitance value of the detection capacitor C21 is determined" is called a calibration period T31, and the period during which "the reference value is established according to the equivalent capacitance value" is called a establishment period T32. After the calibration periods T31 and the establishment period T32, the second sensing circuit 142 determines the capacitance change of the detection capacitor C21 according to the reference value during a detection periods T33, so as to determine whether a touch event occurs.

As shown in waveform of FIG. 3, a time length of the second sensing circuit 142 determining the equivalent capacitance value of the detection capacitor C21 is longer (i.e., the calibration periods T31). Therefore, when the display device 100 is woke up and need to activate the touch function, it will be a blank time that the touch function cannot be used (i.e., the calibration periods T31 and the establishment period T32).

Referring to FIG. 1, the present disclosure arranges two sensing circuits 141 and 142 in the display device 100, and the time and power consumption required for sensing circuits 141 and 142 to establish the reference value are different. The first sensing circuit 141 determines/detects the equivalent capacitance value (the environmental capacitance value) of the detection capacitor C21 in the initial period to obtain a first reference value. The second sensing circuit 142 determines/detects the equivalent capacitance value (the environmental capacitance value) of the detection capacitor C21 in multiple calibration periods. A time length of the initial period is less than a total time length of multiple calibration periods. In one embodiment, when detecting the environmental capacitance value, under a condition that the same time has passed, the power consumption of the first sensing circuit 141 is greater than the power consumption of the second sensing circuit 142 The present disclosure alternately drives the first sensing circuit 141 and the second sensing circuit 142. Accordingly, the touch function of the display device 100 can be activated faster.

Figure 4:
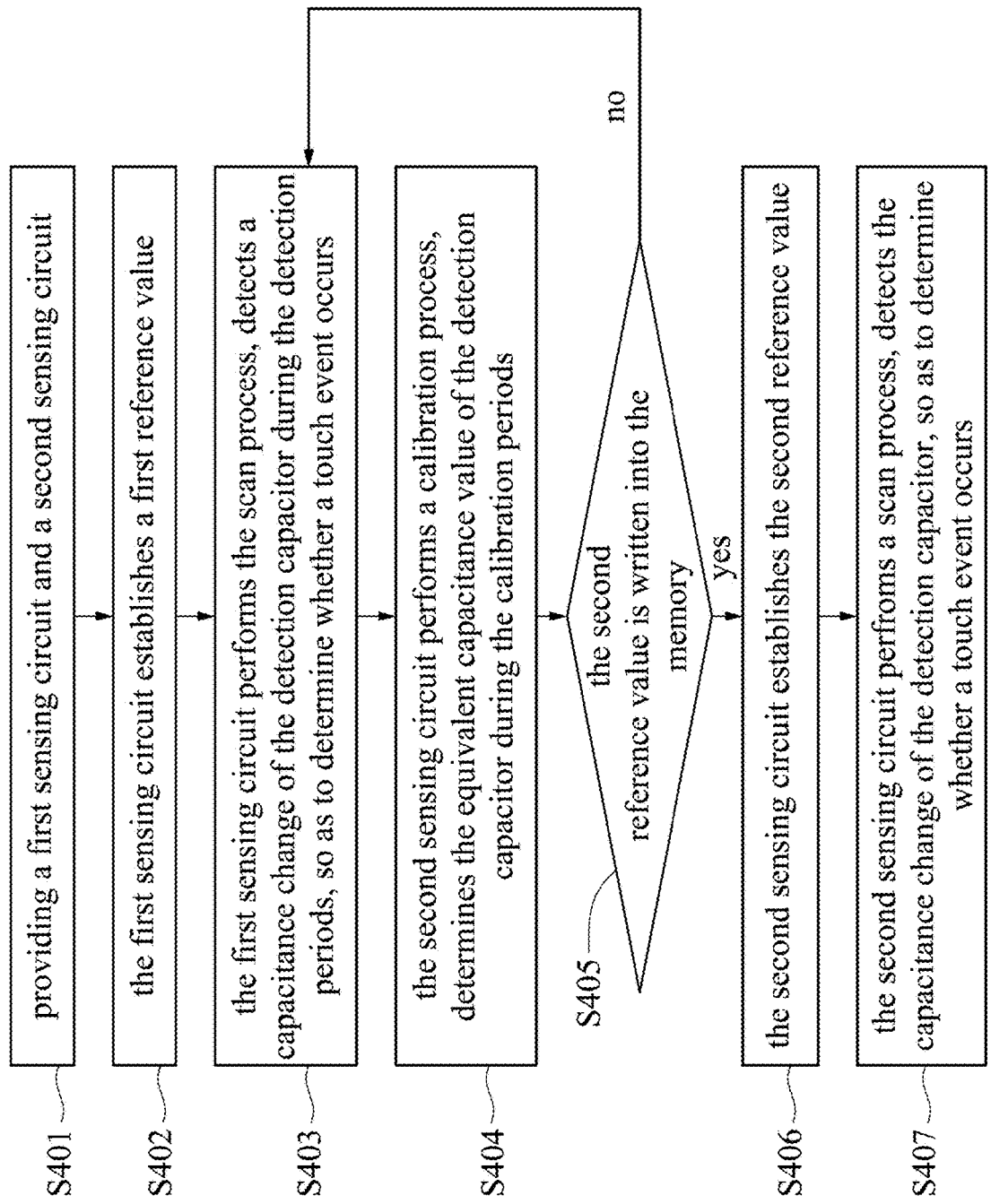
FIG. 4 is a flow chart of the touch calibration method in some embodiments of the present disclosure.
Figure 5:
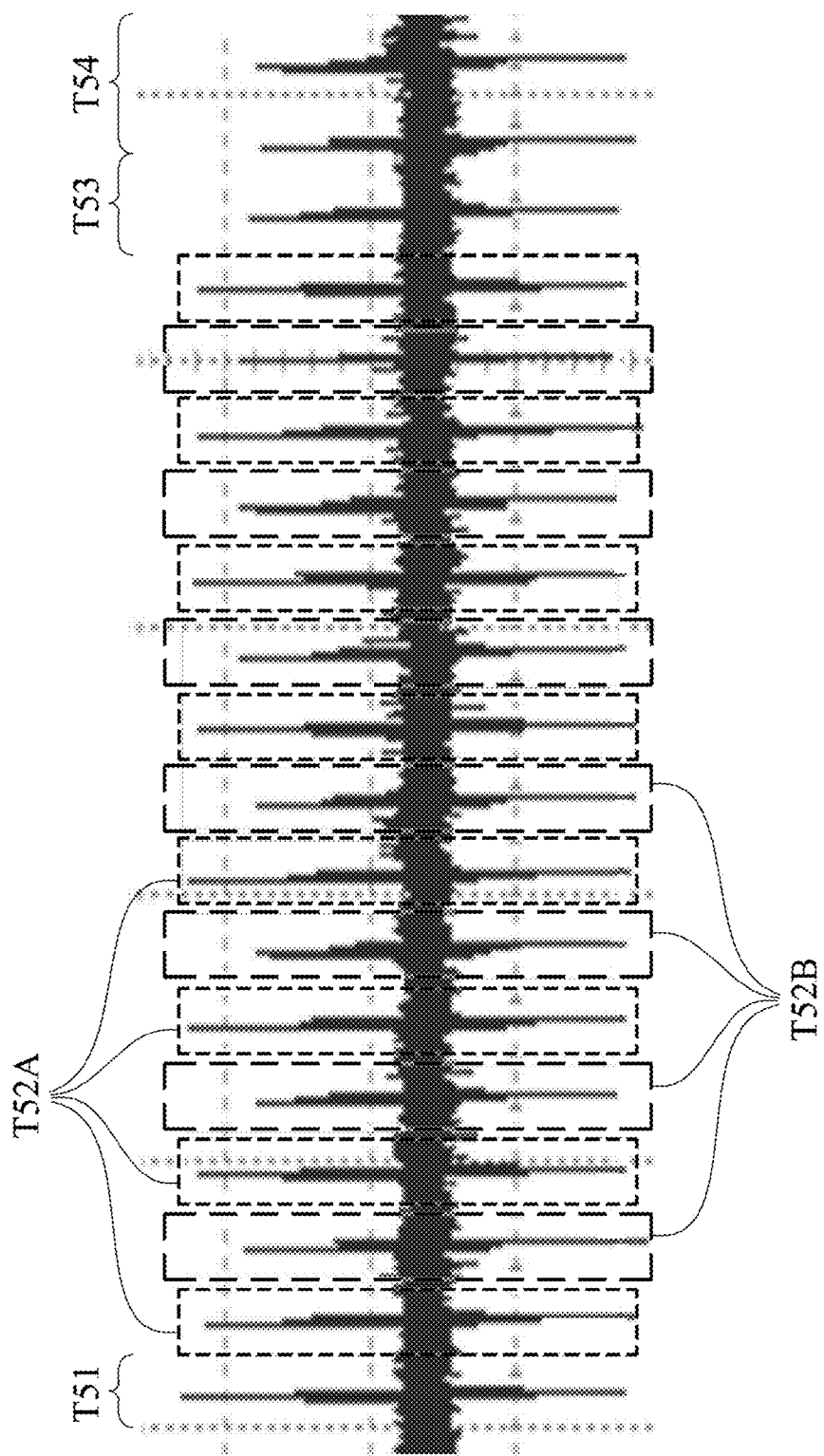
FIG. 5 is a schematic waveform diagram of the sensing circuit in some embodiments of the present disclosure.

For ease of understanding, the flow chart in FIG. 4 is used as an example to illustrate the touch calibration method in some embodiments of the present disclosure. referring to FIGS. 1, 2, 4, 5, wherein FIG. 5 is a schematic waveform diagram obtained by the processor 140 during performing the touch calibration method in some embodiments of the present disclosure. In step S401, the display device 100 is provided with a first sensing circuit 141 and a second sensing circuit 142. In one embodiment, the display device 100 further includes a memory 130. The memory 130 is coupled to the processor 140, and is configured to temporarily store various signals and data received, detected or calculated by the processor 140.

In step S402, the first sensing circuit 141 establishes a first reference value. In one embodiment, as shown in FIG. 5, the first sensing circuit 141 detects the equivalent capacitance value (the environmental capacitance value) of the detection capacitor C21 during the initial period T51, so as to use as a first reference value. In other embodiments, if the processor 140 determines that the current time/condition is not sufficient to complete detection in the initial period T51, the processor 140 can use a reference value previously established by the first sensing circuit 141 as the first reference value (e.g., when the display device 100 was woken up last time, the first sensing circuit 141 established a reference value by the detection).

In one embodiment, step S402 can perform/activate in response to a wake-up signal received by the processor 140 (e.g., the processor 140 activates the display circuit 110 according to a wake-up signal). The wake-up signal may be generated when the user presses a power button of the display device 100 or activates the display device 100 by a sensing gesture. The wake-up signal can also be a debugging signal actively input by the user. For example, when the performance of the touch circuit 120 is abnormal, the user actively requests the processor 140 to perform calibration.

In step S403, after establishing the first reference value, the first sensing circuit 141 performs a scan process, that is, detecting a capacitance change of the detection capacitor C21 during the detection periods T52A, so as to determine whether a touch event occurs. For example, the first sensing circuit 141 detects the current change of the detection capacitor C21, and converts the detection result into a detection count value by the analog-to-digital conversion circuit 220 and the digital back-end circuit 230. The detection count value is compared with a reference count value corresponding to the first reference value, if the difference is greater than a predetermined value, it means that a touch event has occurred.

In step S404, the second sensing circuit 142 performs a calibration process, determining the equivalent capacitance value (the environmental capacitance value) of the detection capacitor C21 during the calibration periods T52B, so as to establish a second reference value. As mentioned above, in some embodiments, a time length of the initial period T51 is less than a total time length of the plurality of calibration periods T52B.

In step S405, at an end of each calibration period T52B, the processor 140 determines whether the second reference value is written into the memory 130. If the second reference value is already written into the memory 130, it means that the calibration process of the second sensing circuit 142 has been completed. If the second reference value is not written into the memory 130, it means that the calibration process of the second sensing circuit 142 has not been completed (e.g., insufficient data samples for detection). At this time, return to step S403 and switch to determining whether a touch event occurs by the first sensing circuit 141 again. Therefore, the detection periods T52A and the calibration periods T52B are set staggered with each other.

In other words, after establishing the first reference value, the processor 140 is configured to alternately drive the first sensing circuit 141 and the second sensing circuit 142 until the second sensing circuit 142 generates the second reference value according to the equivalent capacitance value of the detection capacitor C21.

As shown in waveform of FIG. 5, the detection periods T52A and the calibration periods T52B are staggered/interleaved. That is, each time a frame period passes, it switches to the detection periods T52A or the calibration periods T52B. However, in other embodiments, the interleaving frequency of the detection periods T52A and the calibration periods T52B can be adjusted. For example, two frame periods are a detection period T52A, and then one frame period switches to a calibration period T52B.

In one embodiment, the update frequency of the display circuit 110 can be between 60 Hz and 120 Hz, so the time length of each period (i.e., the initial period T51, the detection periods T52A or the calibration periods T52B) can be between 5 and 20 milliseconds. Specifically, the time length of each period can be between 8.3 milliseconds and 16.6 milliseconds.

In one embodiment, during the detection periods T52A, the processor 140 drives the first sensing circuit 141, but temporarily stops driving the second sensing circuit 142. Relatively, during the calibration periods T52B, the processor 140 temporarily stops driving the first sensing circuit 141, and changes to drive the second sensing circuit 142.

In step S406, when the second reference value is written into the memory 130, it means that the calibration process of the second sensing circuit 142 has been completed. At this time, the establishment period T53 will be entered/activated, and the second sensing circuit 142 establishes the second reference value according to the equivalent capacitance value recorded during the calibration process.

In step S407, after establishing the second reference value, the scan period T54 will be entered/activated, the second sensing circuit 142 performs the scan process, that is, detects the capacitance change of the detection capacitor C21, so as to determine whether a touch event occurs. In one embodiment, during the scan period T54, the processor 140 uses the second sensing circuit 142 to detect the capacitance change to determine whether a touch event occurs without using the first sensing circuit 141, so as to reduce operating power.

As shown in FIG. 1, in one embodiment, the display device 100 further includes a capacitance compensation circuit 143. Relatively, the analog front-end circuit 210 in FIG. 2 further includes a capacitance compensation circuit 211 (equal to the capacitance compensation circuit 143 in FIG. 1) and a signal conversion circuit 212. The capacitance compensation circuit 143/211 is coupled to the first sensing circuit 141 and/or the second sensing circuit 142 (e.g., the sensing circuits 141/142 are coupled to the detection capacitor C21 by a capacitance compensation circuit, respectively), so as to adjust the capacitance value of the calibration capacitor according to the reference value, so that the processor 140/200 generates the touch signal St according to the capacitance change of the detection capacitor C21 and the capacitance value of the calibration capacitor.

The following uses the second sensing circuit 142 as an example to illustrate the operation of the capacitance compensation circuit 143/211. The capacitance compensation circuit 143/211 includes an adjustable capacitor (hereinafter called a calibration capacitor). The capacitance compensation circuit 143/211 is configured to adjust the capacitance value of the calibration capacitor according to the second reference value, so that the processor 140/200 generates the touch signal St according to the capacitance change of the detection capacitor C21 and the capacitance value of the calibration capacitor. Specifically, when the second sensing circuit 142 detects the current change of the detection capacitor C21 to generate a detection current signal Ic1, the capacitance compensation circuit 143/211 sets the capacitance value of the calibration capacitor according to the second reference value. When the calibration capacitor is charged, it will draw the current of the detection current signal Ic1, which is equivalent to generating a reverse current signal Ic2. By counteracting the detection current signal Ic1 by the reverse current signal Ic2 (i.e., similar to calculation of "return to zero"), the impact of the environmental capacitance value will be eliminated to more accurately determine whether a touch event occurs. The signal conversion circuit 212 is configured to convert the signal generated by the capacitance compensation circuit 143/211 into a voltage format or current format for processing by the analog-to-digital conversion circuit 220.

In the foregoing embodiments, the processor 140 is arranged in the display device 100, but in other embodiments, the touch circuit 120 and the processor 140 can be independently used as a touch device, and are not limited to being arranged in the display device 100.

The elements, method steps, or technical features in the foregoing embodiments may be combined with each other, and are not limited to the order of the specification description or the order of the drawings in the present disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A touch device, comprising:
    a touch circuit; and
    a processor coupled to the touch circuit, comprising:
        a first sensing circuit coupled to a detection capacitor of the touch circuit, and configured to detect a capacitance change of the detection capacitor according to a first reference value; and
        a second sensing circuit coupled to the detection capacitor of the touch circuit, and configured to determine an equivalent capacitance value of the detection capacitor to generate a second reference value, wherein the second sensing circuit is configured to detect the capacitance change of the detection capacitor according to the second reference value;
    wherein the first sensing circuit detects the capacitance change of the detection capacitor in a plurality of detection periods, the second sensing circuit determines the equivalent capacitance value of the detection capacitor in a plurality of calibration periods, and the plurality of calibration periods and the plurality of detection periods are staggered,
    wherein after the second sensing circuit generates the second reference value, the processor is configured to drive the second sensing circuit to determine whether a touch event occurs in a scan period after the detection periods and the calibration periods without using the first sensing circuit.

2. The touch device of claim 1, wherein during the plurality of detection periods, the processor drives the first sensing circuit, and stops driving the second sensing circuit.

3. The touch device of claim 1, wherein at an end of each of the plurality of calibration periods, the processor determines whether the second reference value is written into a memory of the touch device.

4. The touch device of claim 1, wherein the first sensing circuit obtains the first reference value in an initial period, and a time length of the initial period is less than a total time length of the plurality of calibration periods.

5. The touch device of claim 1, wherein the processor comprises:
    a capacitance compensation circuit coupled to the second sensing circuit, and configured to adjust a capacitance value of a calibration capacitor according to the second reference value, so that the processor generates a touch signal according to the capacitance change of the detection capacitor and the capacitance value of the calibration capacitor.

6. The touch device of claim 1, wherein a time length of each of the plurality of detection periods of the plurality of calibration periods is between 5 and 20 milliseconds.

7. A touch calibration method, comprising:
    providing a first sensing circuit and a second sensing circuit, wherein the first sensing circuit and the second sensing circuit are coupled to a detection capacitor of a touch circuit;
    establishing, by the first sensing circuit, a first reference value;
    detecting, by the first sensing circuit, a capacitance change of the detection capacitor in a plurality of detection periods, and determining, by the second sensing circuit, an equivalent capacitance value of the detection capacitor in a plurality of calibration periods to generate a second reference value, wherein the plurality of calibration periods and the plurality of detection periods are staggered; and
    after the second reference value is generated by the second sensing circuit, driving the second sensing circuit to determine whether a touch event occurs in a scan period after the detection periods and the calibration periods without using the first sensing circuit.

8. The touch calibration method of claim 7, wherein during the plurality of detection periods, stopping driving the second sensing circuit.

9. The touch calibration method of claim 7, further comprising:
    at an end of each of the plurality of calibration periods, determining whether the second reference value is written into a memory.

10. The touch calibration method of claim 7, wherein determining the equivalent capacitance value of the detection capacitor in the plurality of calibration periods to generate the second reference value comprises:
    detecting, by the second sensing circuit, a current change of the detection capacitor to generate the equivalent capacitance value.

11. The touch calibration method of claim 7, wherein establishing the first reference value comprises:
    obtaining, by the first sensing circuit, the first reference value in an initial period, wherein a time length of the initial period is less than a total time length of the plurality of calibration periods.

12. A display device, comprising:
    a display circuit;
    a touch circuit; and
    a processor coupled to the display circuit and the touch circuit, comprising a first sensing circuit and a second sensing circuit, wherein the first sensing circuit and the second sensing circuit are respectively configured to detect a capacitance change of a detection capacitor;

wherein when the processor activates the display circuit according to a wake-up signal, the first sensing circuit is configured to establish a first reference value in an initial period to detect the capacitance change of the detection capacitor;

wherein after establishing the first reference value, the processor is configured to alternately drive the first sensing circuit in a plurality of detection periods and the second sensing circuit in a plurality of calibration periods until the second sensing circuit generates a second reference value according to an equivalent capacitance value of the detection capacitor, and the plurality of calibration periods and the plurality of detection periods are staggered, wherein after the second sensing circuit generates the second reference value, the processor is configured to drive the second sensing circuit to determine whether a touch event occurs in a scan period after the detection periods and the calibration periods without using the first sensing circuit.

13. The display device of claim 12, wherein a time length of the initial period is between 5 and 20 milliseconds.

14. The display device of claim 12, wherein the first sensing circuit is configured to detect the capacitance change of the detection capacitor in the plurality of detection periods according to the first reference value;

wherein the second sensing circuit is configured to determine the equivalent capacitance value of the detection capacitor in the plurality of calibration periods.

15. The display device of claim 14, wherein during the plurality of detection periods, the processor drives the first sensing circuit, and stops driving the second sensing circuit.

16. The display device of claim 14, wherein at an end of each of the plurality of calibration periods, the processor determines whether the second reference value is written into a memory.

17. The display device of claim 12, wherein the processor comprises:

a capacitance compensation circuit coupled to the second sensing circuit, and configured to adjust a capacitance value of a calibration capacitor according to the second reference value, so that the processor generates a touch signal according to the capacitance change of the detection capacitor and the capacitance value of the calibration capacitor.

* * * * *